(12) United States Patent
Kamiya

(10) Patent No.: US 12,114,096 B2
(45) Date of Patent: Oct. 8, 2024

(54) IMAGE PROCESSING DEVICE, IMAGE PROCESSING METHOD, AND IMAGE PROCESSING PROGRAM

(71) Applicant: FUJIFILM Corporation, Tokyo (JP)

(72) Inventor: Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/173,341

(22) Filed: Feb. 23, 2023

(65) Prior Publication Data

US 2023/0276020 A1 Aug. 31, 2023

(30) Foreign Application Priority Data

Feb. 25, 2022 (JP) ................. 2022-028599

(51) Int. Cl.
*H04N 5/272* (2006.01)
*H04N 5/265* (2006.01)
*H04N 7/18* (2006.01)

(52) U.S. Cl.
CPC ............. *H04N 5/272* (2013.01); *H04N 5/265* (2013.01); *H04N 7/183* (2013.01)

(58) Field of Classification Search
CPC ........ H04N 7/183; H04N 5/272; H04N 5/265; G06F 3/147; G06F 3/1407; G09G 3/002; G09G 5/14; G09G 5/026; G09G 2340/10; G09G 2340/12; G09G 2340/125; G02B 27/017; G02B 2027/014; G02B 2027/0141; G02B 2027/0178
See application file for complete search history.

(56) References Cited

U.S. PATENT DOCUMENTS

| | | | | |
|---|---|---|---|---|
| 2009/0080802 A1* | 3/2009 | Shuto | ............. | H04N 5/272 382/284 |
| 2012/0212399 A1 | 8/2012 | Border et al. | | |
| 2019/0340823 A1* | 11/2019 | Addoum | ............. | G06F 3/147 |

FOREIGN PATENT DOCUMENTS

| | | | | |
|---|---|---|---|---|
| CN | 110268321 A * | 9/2019 | ............. | G03B 21/16 |
| EP | 3 547 299 A2 | 10/2019 | | |
| JP | 2021-51764 A | 4/2021 | | |
| JP | 2021051764 A * | 4/2021 | ............. | B60K 35/00 |
| WO | WO-2009072986 A1 * | 6/2009 | ............. | G06T 13/80 |
| WO | WO-2013111471 A1 * | 8/2013 | ......... | G02B 26/0833 |
| WO | WO-2020080355 A1 * | 4/2020 | ............. | B60K 35/00 |

OTHER PUBLICATIONS

Extended European Search Report for corresponding European Application No. 23158774.2, dated Jul. 14, 2023.

* cited by examiner

*Primary Examiner* — Ricardo Osorio
(74) *Attorney, Agent, or Firm* — Birch, Stewart, Kolasch & Birch, LLP

(57) ABSTRACT

An image processing device includes a processor that performs composition processing for generating an image, which simulates a transmission state of a virtual image via a transmission-type display, on the basis of a parameter representing characteristics of a model of the transmission-type display from a first image serving as the basis of the virtual image and a second image indicating a real image.

16 Claims, 9 Drawing Sheets

IMAGE PROCESSING DEVICE, IMAGE PROCESSING METHOD, AND IMAGE PROCESSING PROGRAM

CROSS REFERENCE TO RELATED APPLICATIONS

This application claims priority from Japanese Application No. 2022-028599, filed on Feb. 25, 2022, the entire disclosure of which is incorporated herein by reference.

BACKGROUND

1. Technical Field

The present disclosure relates to an image processing device, an image processing method, and a non-transitory computer-readable storage medium storing an image processing program.

2. Related Art

A display, such as an augmented reality (AR) device that displays a state where an image is superimposed on a real world, is known in the related art. A technique that reproduces a display state displayed on the augmented reality device with another display device is known.

For example, JP2021-051764A discloses a technique for recording an image captured by a camera and a displayed virtual image and causing another display device to display the image and the virtual image according to user's designation in a display system that generates a virtual image corresponding to augmented reality (AR) and causes a display unit to display the virtual image.

SUMMARY

According to the technique disclosed in JP2021-051764A, the degree of reproduction may not be sufficient in a case where a virtual image displayed on a transmission-type display is reproduced with a non-transmission-type display.

The present disclosure has been made in consideration of the above-mentioned circumstances, and an object of the present disclosure is to provide an image processing device, an image processing method, and an image processing program that can accurately reproduce a visually recognized state shown on a transmission-type display.

An image processing device according to a first aspect of the present disclosure comprises a processor that is configured to perform composition processing for generating an image, which simulates a transmission state of a virtual image via a transmission-type display, on the basis of a parameter representing characteristics of a model of the transmission-type display from a first image serving as the basis of the virtual image and a second image indicating a real image.

According to a second aspect of the present disclosure, in the image processing device according to the first aspect, the transmission-type display includes a transmission unit that transmits light to provide the real image to an observer and a projection unit that projects information onto the transmission unit to generate the virtual image, and the processor is configured to reproduce a visually-recognized image which is visually recognized by the observer who uses the transmission-type display and in which the information is inserted into a visual field of the real image and superimposes the first image, which represents the information projected onto the transmission unit, on the second image, which serves as a background of the first image, to perform the composition processing.

According to a third aspect of the present disclosure, in the image processing device according to the first aspect, the processor is configured to perform image processing and superimposes an image on dimensional data of a brightness of at least one of the first image or the second image.

According to a fourth aspect of the present disclosure, in the image processing device according to the third aspect, in a case where a ratio of a brightness a2, which is preset as a brightness of the first image perceived by a human, to a brightness a1 of the first image output from the projection unit, is denoted by a, and a ratio of a brightness b2, which is preset as a brightness of the second image visually recognized by a human through a transmission unit, to a brightness b1 of the second image, is denoted by b, the processor is configured to determine a transmittance of the first image using a/b unique to a model of the transmission-type display.

According to a fifth aspect of the present disclosure, in the image processing device according to the fourth aspect, the processor is configured to perform the composition processing using another parameter, which represents characteristics of the model separately from a/b of the transmission-type display, in addition to a/b.

According to a sixth aspect of the present disclosure, in the image processing device according to the fifth aspect, the other parameter representing the characteristics of the model is at least one parameter of aberration, flare, stray light, or scattering.

According to a seventh aspect of the present disclosure, in the image processing device according to any one of the fourth to sixth aspects, the processor is configured to perform spatial thinning processing on the first image on the basis of a/b.

According to an eighth aspect of the present disclosure, in the image processing device according to any one of the fourth to seventh aspects, in a case where a plurality of frames of the first image are displayed at intervals, the processor is configured to determine a display time of one frame on the basis of a/b.

According to a ninth aspect of the present disclosure, in the image processing device according to any one of the fourth to eighth aspects, each of a and b has a spatial distribution in a display surface of the transmission-type display.

According to a tenth aspect of the present disclosure, in the image processing device according to any one of the fourth to ninth aspects, in a case where a camera for capturing the real image is provided on the transmission-type display, the second image is an image captured by the camera and b1 denotes a brightness of the second image captured by the camera.

According to an eleventh aspect of the present disclosure, in the image processing device according to any one of the first to ninth aspects, regardless of whether or not a camera for capturing the real image is provided on the transmission-type display, the second image is an image captured by a camera different from the camera provided on the transmission-type display or is an image created using computer graphics (CG).

According to a twelfth aspect of the present disclosure, in the image processing device according to any one of the first to eleventh aspects, the second image is a video.

According to a thirteenth aspect of the present disclosure, in the image processing device according to any one of the first to twelfth aspects, the processor is configured to superimpose the first image on the second image on the basis of a detection result that is obtained in a case where a position of a subject, which is included in the real image, in a real space is detected by a space recognition sensor.

An image processing method according to a fourteenth aspect of the present disclosure comprises causing a processor to perform composition processing for generating an image, which simulates a transmission state of a virtual image via a transmission-type display, on the basis of a parameter representing characteristics of a model of the transmission-type display from a first image serving as the basis of the virtual image and a second image indicating a real image.

According to a fifteenth aspect of the present disclosure, in the image processing method according to the fourteenth aspect, the transmission-type display includes a transmission unit that transmits light to provide the real image to an observer and a projection unit that projects information onto the transmission unit to generate the virtual image, and the processor is configured to reproduce a visually-recognized image which is visually recognized by the observer who uses the transmission-type display and in which the information is inserted into a visual field of the real image and superimposes the first image, which represents the information projected onto the transmission unit, on the second image, which serves as a background of the first image, to perform the composition processing.

A non-transitory computer-readable storage medium storing an image processing program according to a sixteenth aspect of the present disclosure executable by a processor to perform composition processing for generating an image, which simulates a transmission state of a virtual image via a transmission-type display, based on a parameter representing characteristics of a model of the transmission-type display from a first image serving as a basis of the virtual image and a second image indicating a real image.

According to a seventeenth aspect of the present disclosure, in the non-transitory computer-readable storage medium according to the sixteenth aspect, the transmission-type display includes a transmission unit that transmits light to provide the real image to an observer and a projection unit that projects information onto the transmission unit to generate the virtual image, and the image processing program executable by the processor to reproduce a visually-recognized image which is visually recognized by the observer who uses the transmission-type display and in which the information is inserted into a visual field of the real image, and superimpose the first image, which represents the information projected onto the transmission unit, on the second image, which serves as a background of the first image, to perform the composition processing.

According to the present disclosure, a visually recognized state shown on a transmission-type display can be accurately reproduced.

DESCRIPTION OF EMBODIMENTS

Examples of an embodiment of a technique of the present disclosure will be described in detail below with reference to the drawings.

Figure 1:
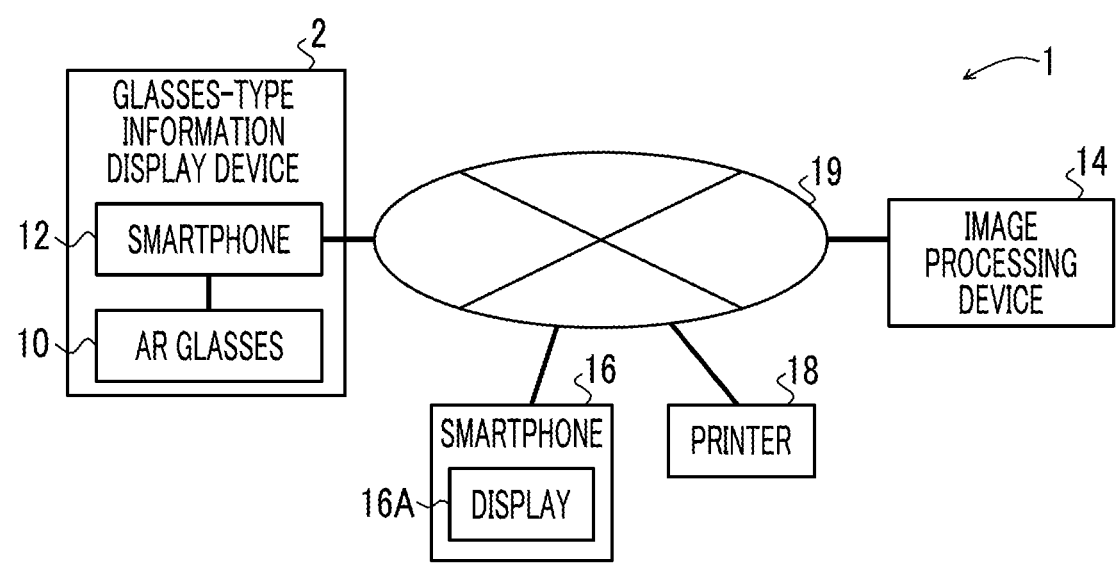
FIG. 1 is a diagram showing an example of the configuration of an image display system of an embodiment.

The configuration of an image display system 1 of the present embodiment will be described with reference to FIG. 1. As shown in FIG. 1, the image display system 1 of the present embodiment comprises a glasses-type information display device 2, an image processing device 14, a smartphone 16, and a printer 18. The glasses-type information display device 2, the image processing device 14, the smartphone 16, and the printer 18 are connected to each other via a network 19 by wired communication or wireless communication.

The glasses-type information display device 2 projects a projection image, which is provided from a smartphone 12, to a user who visually recognizes a real image using AR glasses 10, so that the user can visually recognize a state where a virtual image is superimposed on a visual field of a real image.

The image processing device 14 generates an image, which simulates the transmission state of a virtual image via the glasses-type information display device 2, on the basis of parameters representing the characteristics of the model of the glasses-type information display device 2 from a projection image that serves as the basis of the virtual image and a captured image that indicates a real image. Hereinafter, an image that simulates the transmission state of the virtual image via the glasses-type information display device 2 will be referred to as a composite image.

The smartphone 16 can acquire the composite image, which is generated by the image processing device 14, to display a visually-recognized image, which is visually recognized by the user using the AR glasses 10 of the glasses-type information display device 2 and in which the real image and the virtual image are combined with each other, using a display 16A. Further, the printer 18 can acquire the composite image, which is generated by the image processing device 14, to print the visually-recognized image which is visually recognized by the user using the AR glasses 10 of the glasses-type information display device 2 and in which the real image and the virtual image are combined with each other.

Figure 2:
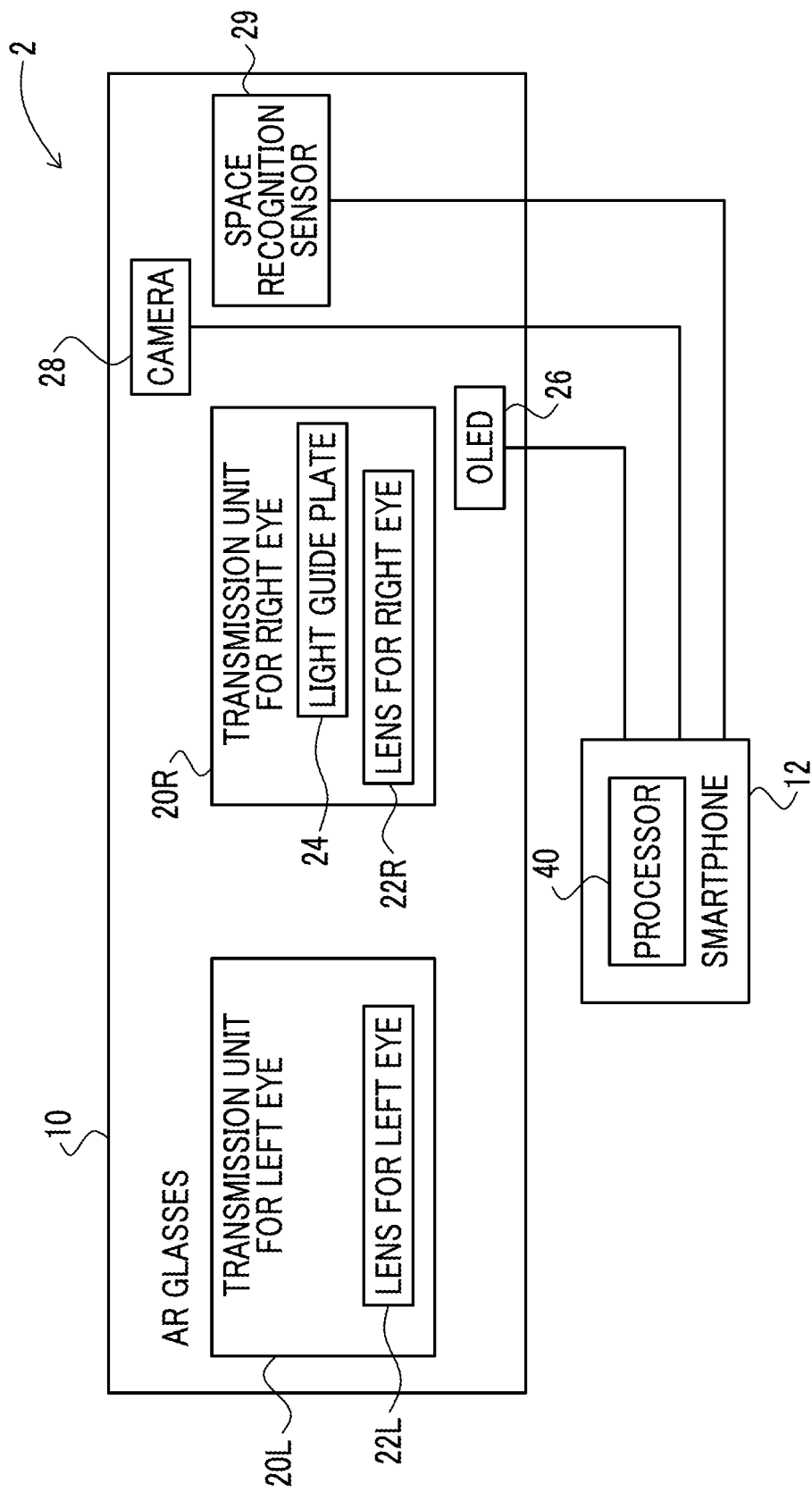
FIG. 2 is a diagram showing an example of the configuration of a glasses-type information display device.

The configuration of the glasses-type information display device 2 of the present embodiment will be described with reference to FIG. 2. As shown in FIG. 2, the glasses-type information display device 2 of the present embodiment comprises augmented reality (AR) glasses 10 and a smartphone 12.

Figure 3:
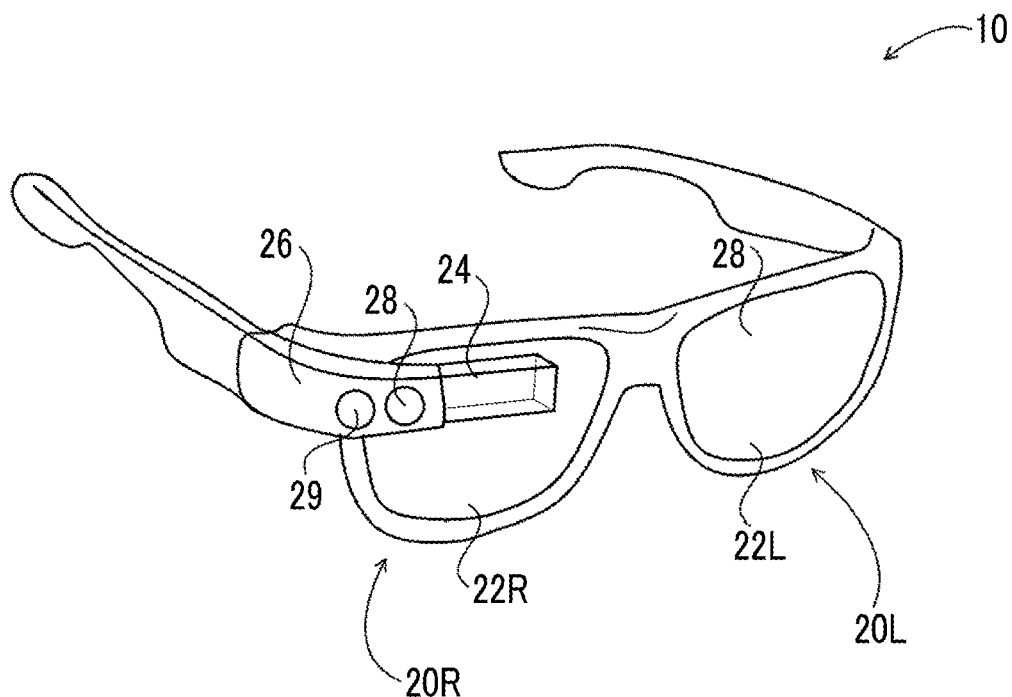
FIG. 3 is a perspective view showing an example of AR glasses of the embodiment.

The AR glasses 10 are a device that allows a user to visually recognize a projection image, which is projected from an organic light emitting diode (OLED) 26, in a state where the projection image is superimposed on a real image. FIG. 3 is a perspective view of an example of the AR glasses 10 of the present embodiment. As shown in FIGS. 2 and 3, the AR glasses 10 comprise a pair of a transmission unit 20L for a left eye and a transmission unit 20R for a right eye, an OLED 26, a camera 28, and a space recognition sensor 29. The transmission unit 20R for a right eye of the present embodiment is an example of a transmission unit of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner. The OLED 26 of the present embodiment is an example of a projection unit of the present disclosure, and the projection image projected from the OLED 26 is an example of a first image of the present disclosure.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye and is guided to the right eye of the user. Further, the user visually recognizes the real world, which is shown through the lens 22R for a right eye, as a real image with the right eye.

For this reason, while the projection image is projected from the OLED 26, the visually-recognized image visually recognized with the right eye of the user is in a state where the projection image projected onto the light guide plate 24 is superimposed on the real image representing the real world shown through the lens 22R for a right eye. Further, while the projection image is not projected from the OLED 26, the visually-recognized image visually recognized by the user is the real image that represents the real world shown through the lens 22R for a right eye and the light guide plate 24.

The camera 28 is a camera that images the real world visually recognized by a user. Examples of the camera 28 include a digital camera, such as a complementary metal oxide semiconductor (CMOS) camera, and it is preferable that a color image can be captured. Image data of a captured image, which is captured by the camera 28, are output to the smartphone 12. The captured image, which is captured by the camera 28 of the present embodiment and indicates the real image, is an example of a second image of the present disclosure.

The space recognition sensor 29 is a sensor that detects a distance to a subject present in the real world visually recognized by a user. Examples of the space recognition sensor 29 include a monocular camera, a stereo camera, a TOF camera, and the like. A detection result of the space recognition sensor 29 is output to the smartphone 12. Since the detection result of the space recognition sensor 29 is data indicating the position of the subject present in the real world, the detection result of the space recognition sensor 29 is referred to as "position data" hereinafter.

While the projection image is projected from the OLED 26, a captured image is captured by the camera 28 and position data are acquired by the space recognition sensor 29. The image data of the captured image and the position data of the space recognition sensor 29 are stored in the smartphone 12 in association with the image data of the projected projection image.

Further, the transmission unit 20L for a left eye includes a lens 22L for a left eye. The user visually recognizes the real world, which is shown through the lens 22L for a left eye, with the left eye.

Meanwhile, the smartphone 12 comprises a processor 40. The processor 40 of the present embodiment controls the OLED 26 to project the projection image onto the light guide plate 24 from the OLED 26. Further, while the OLED 26 projects the projection image onto the light guide plate 24, the processor 40 controls the camera 28 to image the real world visually recognized by the user and controls the space recognition sensor 29 to detect a distance to a subject present in the real world visually recognized by the user.

Figure 4:
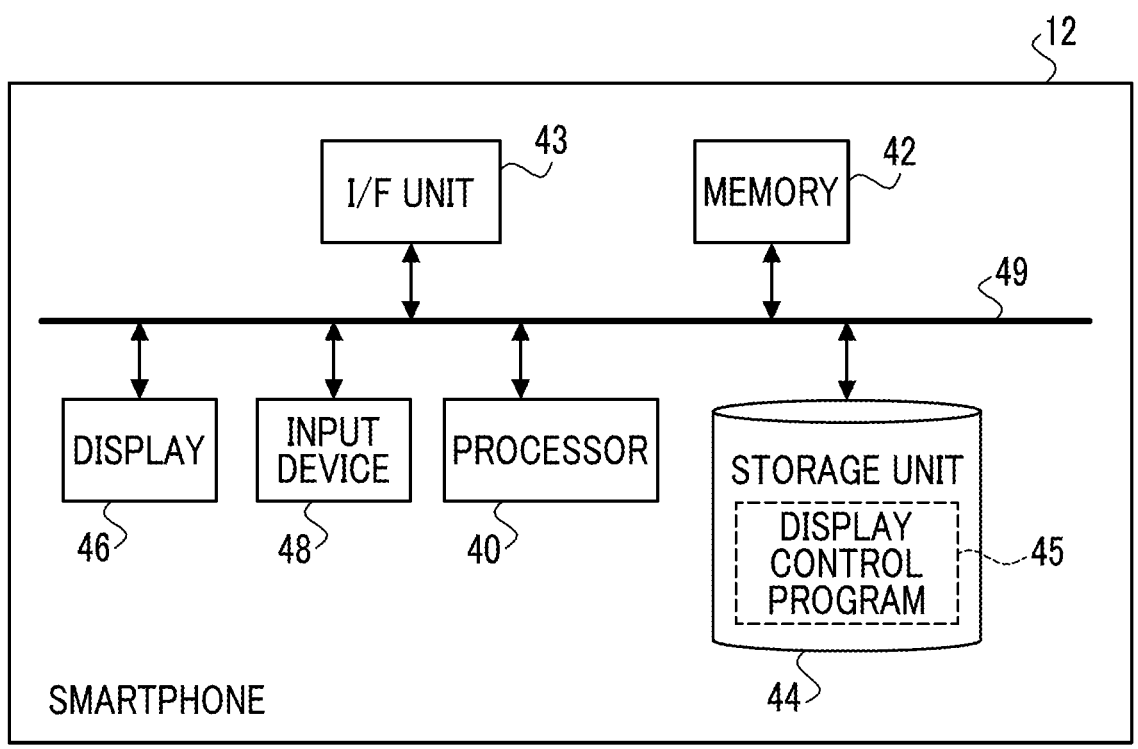
FIG. 4 is a block diagram showing an example of the configuration of a smartphone of the embodiment.

FIG. 4 is a block diagram showing an example of the configuration of the smartphone 12 that is related to a function related to the projection of the projection image. As shown in FIG. 4, the smartphone 12 comprises a processor 40, a memory 42, an interface (I/F) unit 43, a storage unit 44, a display 46, and an input device 48. The processor 40, the memory 42, the I/F unit 43, the storage unit 44, the display 46, and the input device 48 are connected to each other via a bus 49, such as a system bus or a control bus, such that various types of information can be given and received therebetween.

The processor 40 reads out various programs, which include a display control program 45 stored in the storage unit 44, to the memory 42 and performs processing corresponding to the program read out. Accordingly, the processor 40 controls the projection of the projection image that is performed by the OLED 26. The memory 42 is a work memory that is used in a case where the processor 40 performs processing.

The display control program 45, the image data (not shown) of the projection image projected from the OLED 26, various other types of information, and the like are stored in the storage unit 44. Specific examples of the storage unit 44 include a hard disk drive (HDD), a solid state drive (SSD), and the like.

The I/F unit 43 communicates various types of information to each of the OLED 26, the camera 28, the space recognition sensor 29, and the image processing device 14 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. Further, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

Meanwhile, the image processing device 14 has a function of generating a composite image that simulates the transmission state of the virtual image via the glasses-type information display device 2 as described above.

Figure 5:
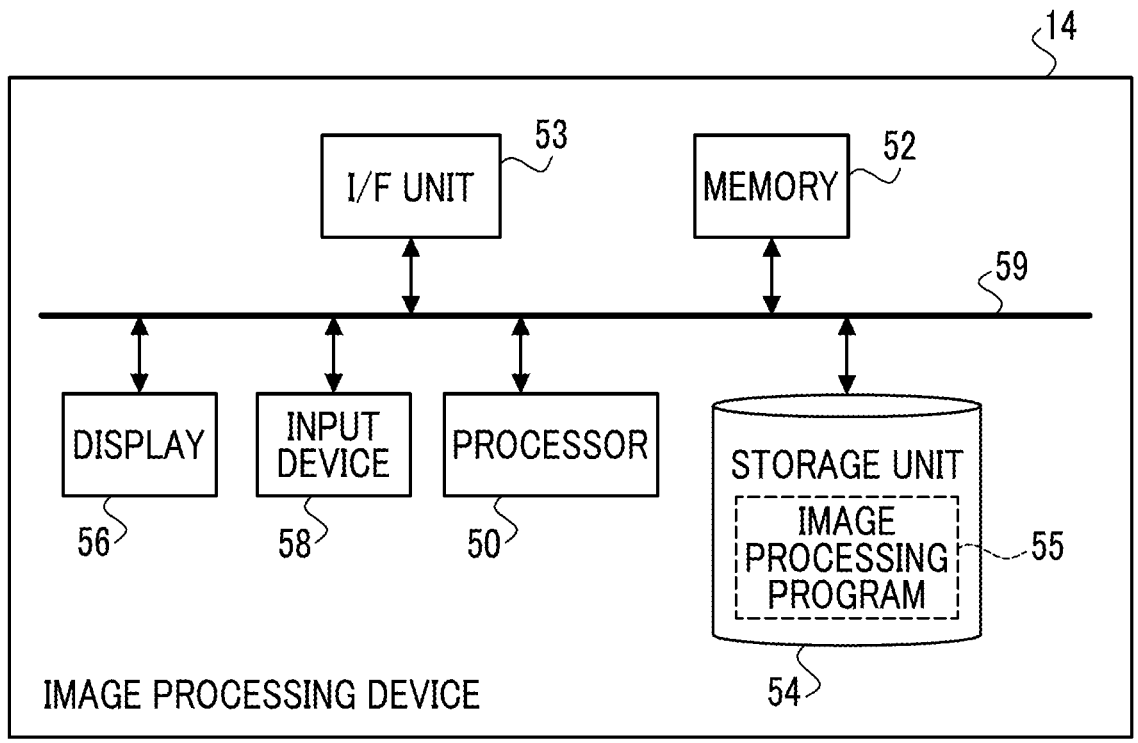
FIG. 5 is a block diagram showing an example of the hardware configuration of the smartphone of the embodiment.

FIG. 5 is a block diagram showing an example of the configuration of the image processing device 14 that is related to a function related to the generation of the composite image. As shown in FIG. 5, the image processing device 14 comprises a processor 50, a memory 52, an I/F unit 53, a storage unit 54, a display 56, and an input device 58. The processor 50, the memory 52, the I/F unit 53, the storage unit 54, the display 56, and the input device 58 are connected to each other via a bus 59, such as a system bus or a control bus, such that various types of information can be given and received therebetween.

The processor 50 reads out various programs, which include an image processing program 55 stored in the storage unit 54, to the memory 52 and performs processing corresponding to the program read out. Accordingly, the processor 50 performs processing for generating the composite image. The memory 52 is a work memory that is used in a case where the processor 50 performs processing.

The image processing program 55, the image data of the projection image projected from the OLED 26 and the image data of the captured image captured by the camera 28 in the glasses-type information display device 2, various other types of information, and the like are stored in the storage unit 54. Specific examples of the storage unit 54 include a HDD, an SSD, and the like.

The I/F unit 53 communicates various types of information to each of the smartphone 12, the smartphone 16, and the printer 18 using wireless communication or wired communication. The display 56 and the input device 58 function as a user interface. The display 56 provides various types of information, which is related to the generation of the composite image, to a user. The display 56 is not particularly limited, and examples of the display 56 include a liquid crystal monitor, a LED monitor, and the like. Further, the input device 58 is operated by a user so that various instructions related to the generation of the composite image are input. The input device 58 is not particularly limited, and examples of the input device 58 include a keyboard, a touch pen, a mouse, and the like. A touch panel display in which the display 56 and the input device 58 are integrated with each other may be employed.

Figure 6:
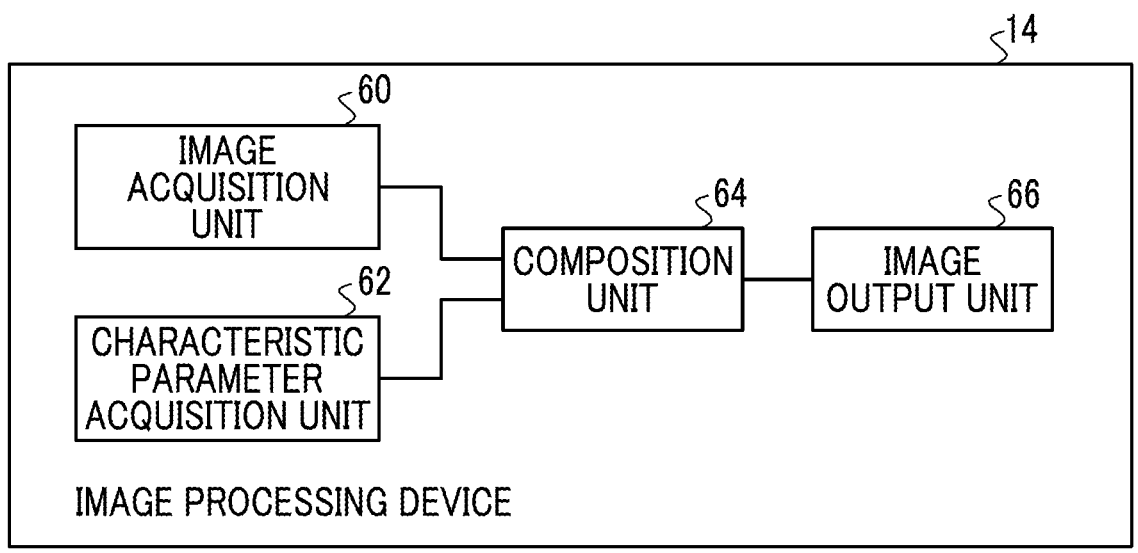
FIG. 6 is a block diagram showing an example of the hardware configuration of an image processing device according to the embodiment.

FIG. 6 is a functional block diagram showing an example of the configuration that is related to the functions of the image processing device 14 according to the present embodiment. As shown in FIG. 6, the image processing device 14 comprises an image acquisition unit 60, a characteristic parameter acquisition unit 62, a composition unit 64, and an image output unit 66. For example, the processor 50 of the image processing device 14 according to the present embodiment executes the image processing program 55 stored in the storage unit 54 to function as the image acquisition unit 60, the characteristic parameter acquisition unit 62, the composition unit 64, and the image output unit 66.

The image acquisition unit 60 has a function of acquiring the image data of the projection image, which is projected from the OLED 26, from the smartphone 12. For example, the image processing device 14 according to the present embodiment acquires the image data of the projection image, the image data of a captured image captured by the camera 28 during the projection of the projection image, and position data from the smartphone 12 in association with each other at a predetermined timing, and stores the image data of the projection image, the image data of the captured image, and the position data, which are acquired, in the storage unit 54. For this reason, the image acquisition unit 60 acquires the image data of the projection image and the image data of the captured image from the smartphone 12 via the I/F unit 53 at an arbitrary timing. Further, in a case where a composite image is to be generated, the image acquisition unit 60 acquires the image data of the projection image, the image data of the captured image, and the position data from the storage unit 54. In a case where a composite image is to be generated, the image acquisition unit 60 outputs the image data of the projection image, the image data of the captured image, and the position data, which are acquired, to the composition unit 64.

Figure 7:
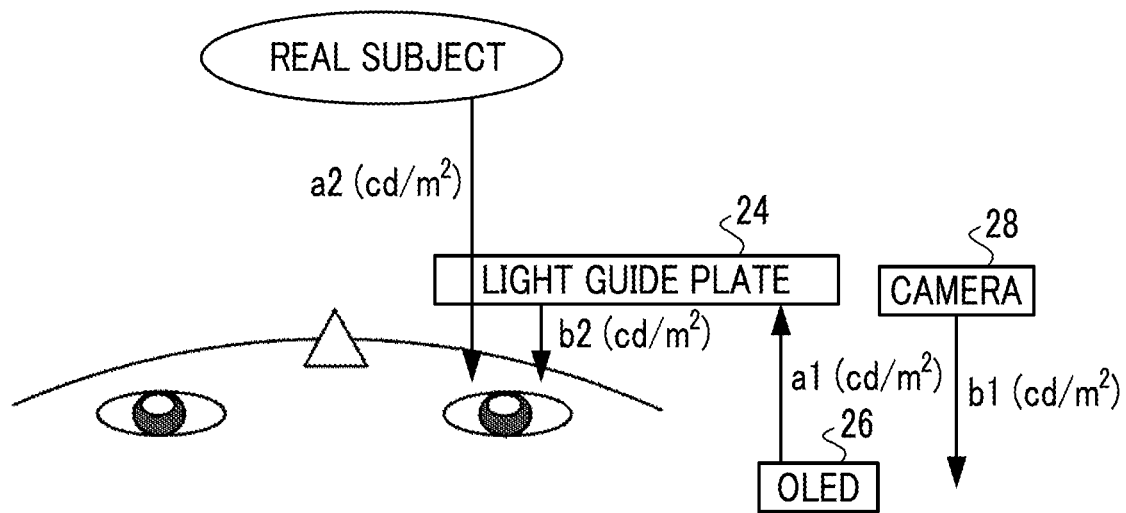
FIG. 7 is a diagram illustrating parameters representing the characteristics of the AR glasses.

The characteristic parameter acquisition unit 62 has a function of acquiring parameters (hereinafter, referred to as characteristic parameters) representing the characteristics of the glasses-type information display device 2 from the smartphone 12. In the present embodiment, as shown in FIG. 7, the characteristic parameter acquisition unit 62 acquires, as an example of the characteristic parameters, a brightness a1 (cd/m$^2$) of the projection image projected from the OLED 26, a brightness a2 (cd/m$^2$) that is preset as the brightness of the projection image perceived by a user, a brightness b1 (cd/m$^2$) of the captured image captured by the camera 28, and a brightness b2 (cd/m$^2$) that is preset as the brightness of the projection image visually recognized by a human through the light guide plate 24. The characteristic parameter acquisition unit 62 outputs the acquired characteristic parameters to the composition unit 64.

Specific values of the brightnesses a1, a2, b1, and b2 may be derived from design on the basis of the transmittance or the reflectance of each member, or values obtained from the measurement of a prototype may be set as the specific values, that is, values obtained from the measurement of the AR glasses 10 described here or the like may be set as the specific values.

Further, a method of acquiring the characteristic parameters by the characteristic parameter acquisition unit 62 is not particularly limited. For example, in a case where the smartphone 12 of the glasses-type information display device 2 stores the characteristic parameters (the brightnesses a1, a2, b1, and b2) and the characteristic parameters are associated with the image data of the projection image, the characteristic parameter acquisition unit 62 may acquire the characteristic parameters associated with the projection image acquired by the image acquisition unit 60. Furthermore, for example, in a case where information indicating the model of the AR glasses 10 is associated with the image data of the projection image, the characteristic parameter acquisition unit 62 may acquire the information indicating the model of the AR glasses 10 associated with the image data of the projection image and may acquire characteristic parameters corresponding to the acquired information indicating the model from an external device or the like through, for example, the network 19.

The composition unit 64 has a function of generating a composite image by performing image processing on dimensional data of the brightness of at least one of the projection image or the captured image and superimposing the projection image on the captured image. For example, the composition unit 64 of the present embodiment has a function of generating a composite image in which the projection image is combined with the captured image on the basis of the characteristic parameters. The composite image is an image in which a visually-recognized image in which the projection image is inserted into the visual field of a real image of a user who uses the AR glasses 10 is reproduced. That is, the composite image generated by the composition unit 64 of the present embodiment is an image that simulates the visibility of the projection image of the visually-recognized image, in other words, the transmission state of a virtual image.

The visibility of the projection image, which is the transmission state of the virtual image, will be described here.

Figure 8:
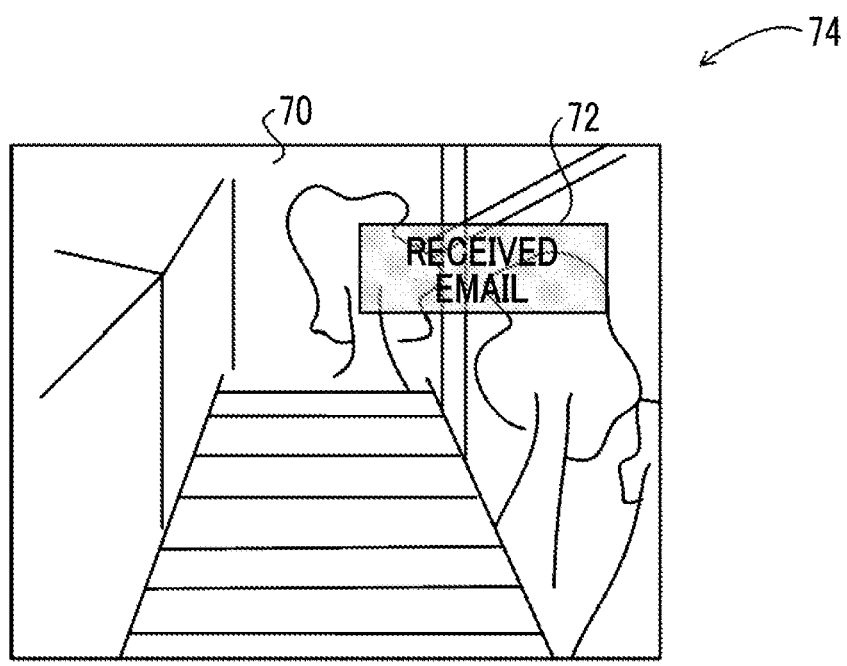
FIG. 8 is a diagram illustrating a visually-recognized image that is visually recognized by a user of the AR glasses.

FIG. 8 shows an example of a visually-recognized image 74 that is visually recognized by a user using the AR glasses 10. Since the AR glasses 10 are a transmission-type display, a virtual image 72 visually recognized via the light guide plate 24 in a case where the projection image is projected from the OLED 26 is visually recognized in a state where a real image 70 is transmitted.

Figure 9:
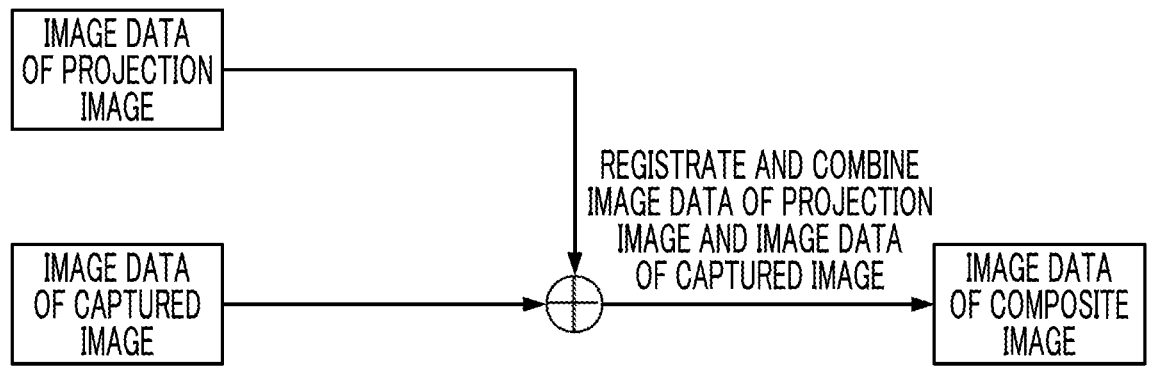
FIG. 9 is a diagram illustrating a generation method in the related art in regard to the generation of image data of a composite image.
Figure 10:
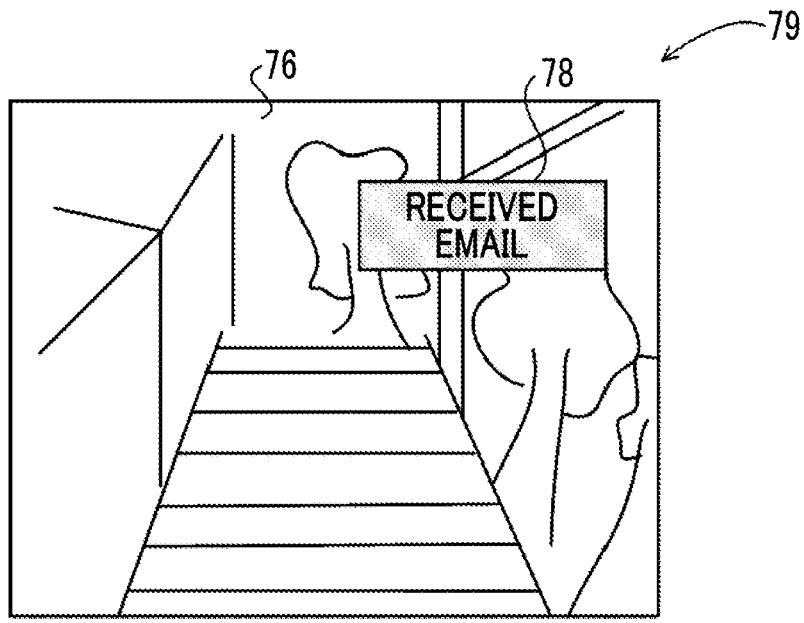
FIG. 10 is a diagram illustrating an example in which a captured image and a projection image are displayed by a non-transmission-type display.

In this state, in the related art, as shown in FIG. 9, image data of a projection image 78 projected from the OLED 26 are combined with image data of a captured image 76 captured by the camera 28 as they are, so that image data of a composite image are generated. In the composite image 79 in the related art generated as in FIG. 9, the appearance of the projection image 78 with respect to the captured image 76 may be different from the appearance of the virtual image 72 with respect to the real image 70 as shown in FIG. 10. Particularly, in a case where the image data of the projection image 78 are combined with the image data of the captured image 76 as they are as shown in FIG. 9 as in a case where the images are displayed on a non-transmission-type display, such as the display 16A of the smartphone 16, a case where the images are printed by the printer 18, or the like, the composite image 79 is generated. In this case, the captured image 76 superimposed on the projection image 78 is not seen through the projection image 78. Further, even though the image is displayed on a transmission-type display, in a case where the model of the transmission-type display of the AR glasses 10 and the model of the transmission-type display on which the projection image 78 and the captured image 76 are displayed are different from each other and parameters representing the characteristics of the models are different from each other, the transmission state of the projection image 78 may be different from the transmission state of the virtual image 72.

Accordingly, the image processing device 14 according to the present embodiment generates a composite image which simulates the transmission state of the virtual image 72 via the AR glasses 10 and in which the captured image 76 and the projection image 78 are combined with each other.

Figure 11:
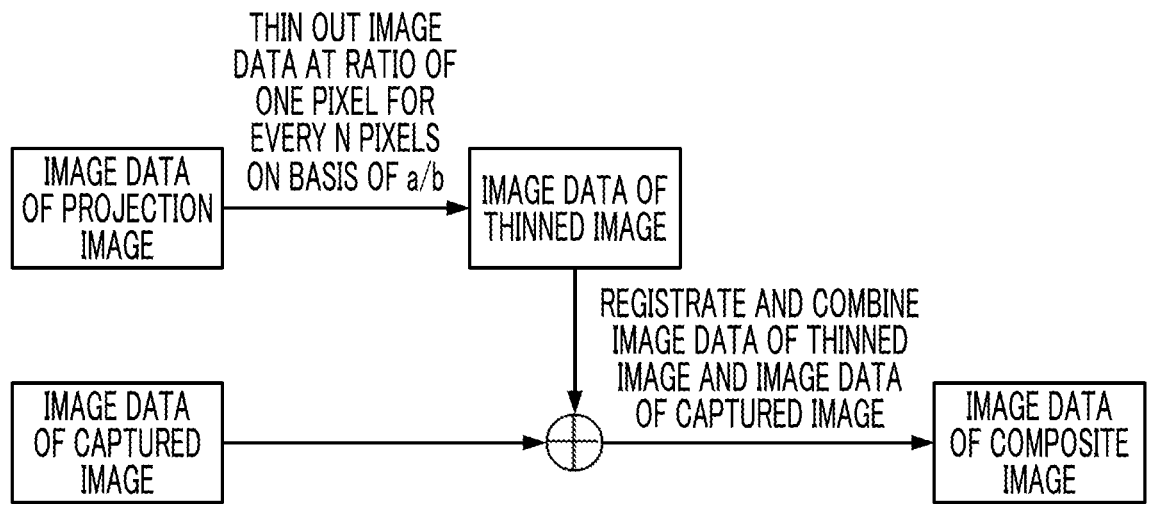
FIG. 11 is a diagram illustrating a generation method of the present embodiment in regard to the generation of image data of a composite image.

As shown in FIG. 11, the composition unit 64 of the present embodiment thins out the image data of the projection image on the basis of the characteristic parameters to generate a thinned image that simulates the transmission state of a virtual image visually recognized by a user using the AR glasses 10. Specifically, the composition unit 64 thins out the image data of the projection image on the basis of a brightness ratio a/b unique to the model of the glasses-type information display device 2. Here, a denotes a ratio of the brightness a2 of the projection image, which is perceived by a user, to the brightness a1 of the projection image output from the OLED 26, and is represented by the following equation (1). Further, b denotes a ratio of the brightness b2 of a real image, which is perceived by a user, to the brightness b1 of the captured image captured by the camera 28, and is represented by the following equation (2). Each of a and b may have a spatial distribution in a display surface of the AR glasses 10.

$$a = a2/a1 \tag{1}$$

$$b = b2/b1 \tag{2}$$

Furthermore, as shown in FIG. 11, the composition unit 64 registrates and combines the image data of the thinned image and the image data of the captured image on the basis of the position data to generate the image data of a composite image.

Figure 12:
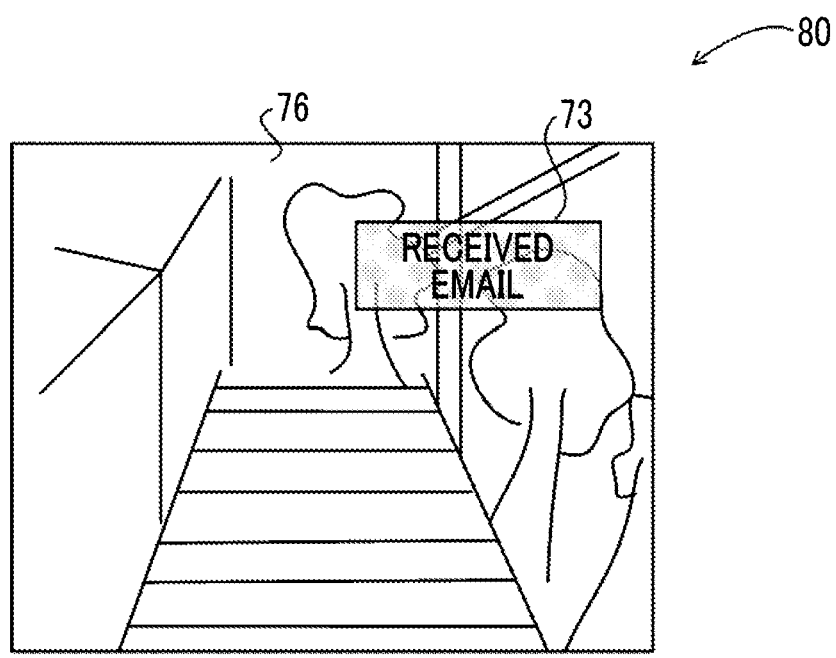
FIG. 12 is a diagram illustrating a composite image of the present embodiment.

FIG. 12 shows an example of the composite image 80 that is combined by the composition unit 64. Since a thinned image 73 is superimposed on the captured image 76 as shown in FIG. 12, the appearance of the thinned image 73 with respect to the captured image 76 is the same as the appearance (see FIG. 8) of the virtual image 72 with respect to the real image 70.

The image output unit 66 has a function of outputting image data, which represent the composite image generated by the composition unit 64, to an arbitrary device. The image output unit 66 of the present embodiment outputs the image data of the composite image to at least one of the smartphone 16 or the printer 18.

Figure 13:
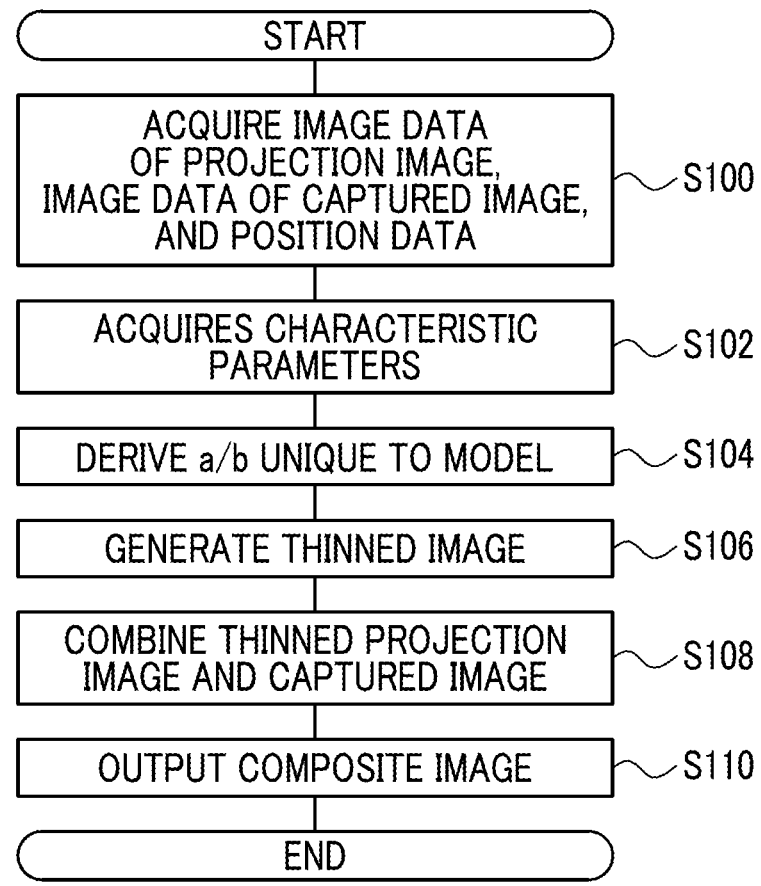
FIG. 13 is a flowchart showing an example of image processing that is performed by the image processing device according to the embodiment.

Next, the action of the image processing device 14 according to the present embodiment will be described. FIG. 13 is a flowchart showing an example of the flow of image processing that is performed by the processor 50 of the image processing device 14 according to the present embodiment. For example, in the image processing device 14 according to the present embodiment, the processor 50 executes the image processing program 55 stored in the storage unit 54 to perform the image processing of which an example is shown in FIG. 13 in a case where an instruction to display the composite image is received from the smartphone 16 or the printer 18.

In Step S100 of FIG. 13, the image acquisition unit 60 acquires the image data of the projection image, the image data of the captured image, and the position data, which are associated with each other, from the storage unit 54 as described above.

In the next step S102, the characteristic parameter acquisition unit 62 acquires the characteristic parameters of the glasses-type information display device 2 that has projected the projection image acquired in Step S100 as described above.

In the next step S104, the composition unit 64 derives a brightness ratio a/b, which is unique to the model of the glasses-type information display device 2, using Equation (1) and Equation (2) as described above.

In the next step S106, the composition unit 64 thins out the projection image on the basis of a/b derived in Step S104 to generate a thinned image. Specifically, the composition unit 64 generates a thinned image in which a brightness value is set to 0 at a ratio of one pixel for every N pixels on the basis of a/b. N is 0 or more and is predetermined according to a/b. Unlike in the present embodiment, a brightness value may be reduced from an original value instead of setting a brightness value to 0. In this case, for example, the degree of a reduction in a brightness value may be predetermined according to a/b. It is preferable that processing, such as gradation transformation, is performed on the thinned image.

In the next step S108, the composition unit 64 registrates and combines the thinned image generated in Step S106 and the captured image acquired in Step S100 on the basis of the position data to generate a composite image. Specifically, the composition unit 64 combines the thinned image and the captured image on the basis of the position data while a spatial position of a subject in a real space is used as a reference. A method of combining the projection image with the captured image is not particularly limited, and for example, an image composition (alpha blending) technique using an alpha channel, or the like may be applied. Examples of a technique related to alpha blending include a technique disclosed in JP2019-185365A.

In the next step S110, the image output unit 66 outputs the image data of the composite image, which is generated in Step S108, to the smartphone 16 or the printer 18 to which an instruction to display the composite image is given. In a case where the processing of Step S110 ends, the image processing shown in FIG. 13 ends.

Modification Example 1

Figure 14:
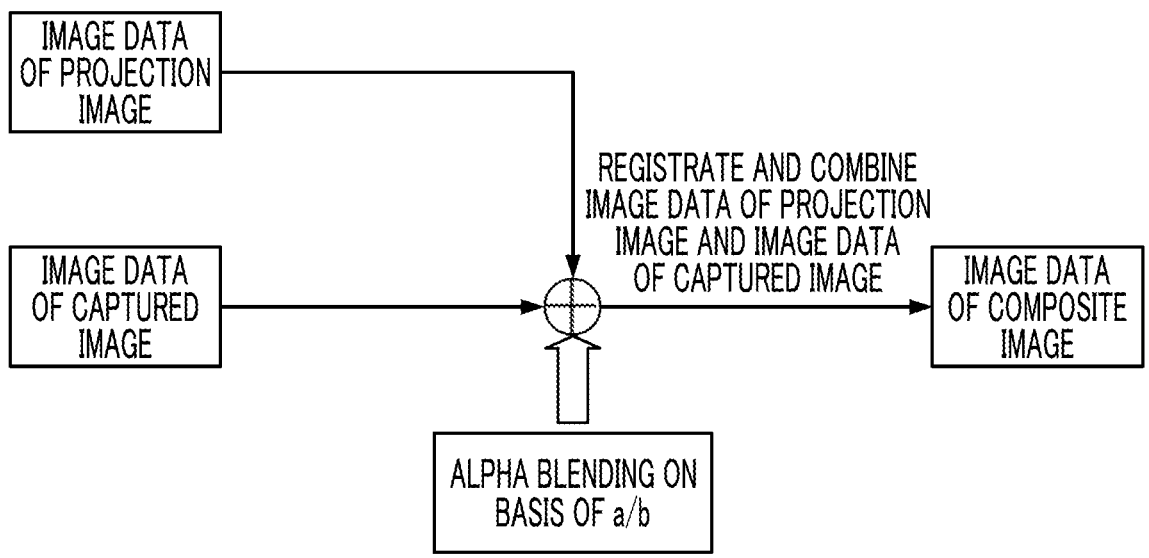
FIG. 14 is a diagram illustrating a generation method of Modification example 1 in regard to the generation of image data of a composite image.

A method of generating a composite image by the composition unit 64 is not limited to the above-mentioned embodiment. An aspect in which the composition unit 64 generates a thinned image on the basis of a/b has been described in the embodiment, but the present disclosure is not limited to this aspect. For example, as shown in FIG. 14, the composition unit 64 may registrate the image data of the projection image and the image data of the captured image on the basis of the position data and may combine the image data of the projection image with the image data of the captured image by alpha blending using an alpha value corresponding to a/b to generate the image data of the composite image. In this case, a correspondence relationship between a value of a/b and the alpha value may be predetermined. Generally, in a case where the alpha value is in the range of 0 to 255, a case where the alpha value is 1 indicates a completely transparent state and a case where the alpha value is 255 indicates a completely opaque state.

Modification Example 2

Figure 15:
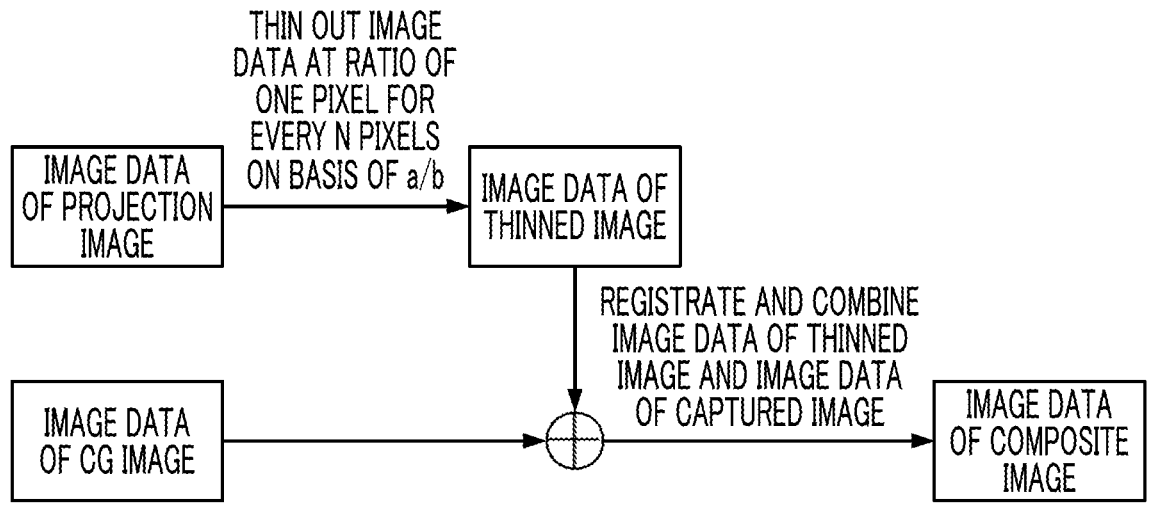
FIG. 15 is a diagram illustrating a generation method of Modification example 2 in regard to the generation of image data of a composite image.

An aspect in which a composite image simulating a visually-recognized image actually visually recognized by a user is generated as an image simulating the transmission state of the virtual image has been described in the above-mentioned embodiment, but an image to be generated is not particularly limited as long as the transmission state of the virtual image is simulated. For example, in a case where a user visually recognizes a specific real world using the AR glasses 10, the image data of a captured image of the real world and the image data of a projection image may be combined with each other as described above to generate the image data of a composite image, which simulates the transmission state of a virtual image, in order to simulate what a visually-recognized image looks like. Further, as shown in FIG. 15, the image data of a CG image generated using computer graphics (CG) and the image data of a projection image may be combined with each other as described above to generate the image data of a composite image simulating the transmission state of a virtual image. In this case, the registration of the image data of the projection image and the image data of the CG image may be appropriately adjusted by an operator who generates a composite image. Furthermore, a/b, which is a characteristic parameter, may also be appropriately set depending on AR glasses 10 to be assumed. The image data of the projection image may also be an image that is tentatively generated using CG.

As described above, according to this modification example, the composite image is not limited to a visually-recognized image that is actually visually recognized by a user, and a composite image, which indicates a visually-recognized image visually recognized by a user in a case where the AR glasses 10 are used, can be generated.

Modification Example 3

Figure 16:
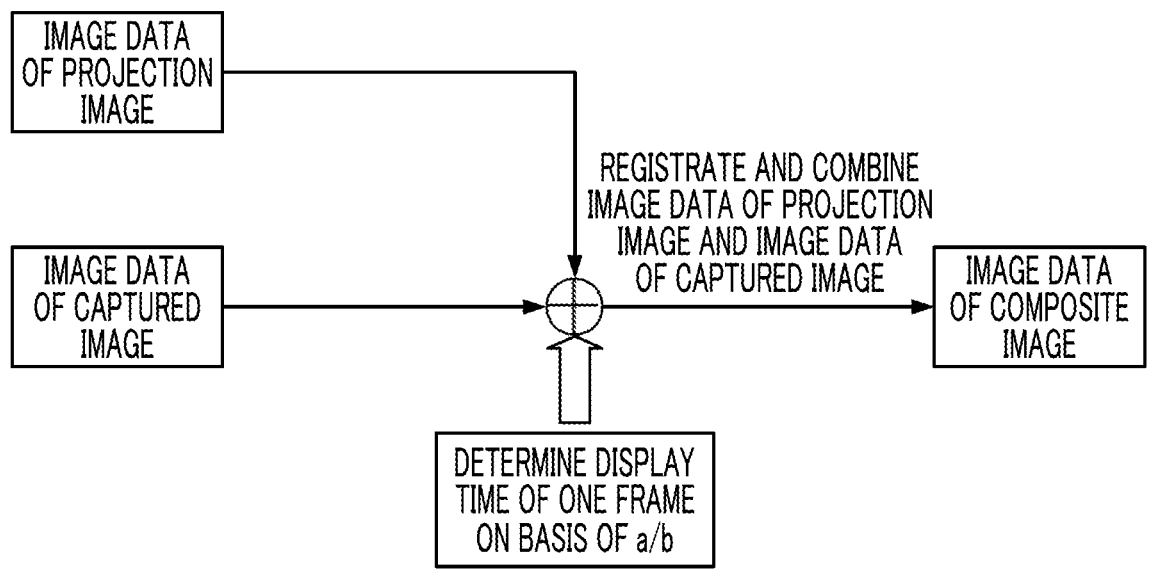
FIG. 16 is a diagram illustrating a generation method of Modification example 3 in regard to the generation of image data of a composite image.

The projection image may include a plurality of frames and the plurality of respective frames may be displayed at intervals, or may be, for example, a video. In this case, the composition unit 64 determines a display time of one frame of the projection image on the basis of a/b as shown in FIG. 16. The image data of a captured image and the image data of the projection image are combined with each other according to the display time to generate the composite image data of a composite image. A correspondence relationship between the display time and a/b may be predetermined.

As described above, the image processing device 14 according to the present embodiment performs composition processing for generating an image, which simulates the transmission state of a virtual image via the glasses-type information display device 2, on the basis of parameters representing the characteristics of the model of the glasses-type information display device 2 from a projection image that serves as the basis of the virtual image and a captured image that indicates a real image.

As described above, according to the image processing device 14 of the present embodiment, since the characteristic parameters of the model of the glasses-type information display device 2 are used, the transmission state of a virtual image can be appropriately simulated. Therefore, according to the image processing device 14 of the present embodiment, a visually recognized state shown on a transmission-type display can be accurately reproduced.

An aspect in which the composition unit 64 generates a composite image on the basis of a/b as the characteristic parameter has been described in the embodiment, but another parameter representing the characteristics of a model may also be further used in addition to a/b as the characteristic parameters. Examples of the other parameter include at least one of aberration, flare, stray light, or scattering. Which parameter is to be used can be appropriately determined according to the simulation accuracy of the transmission state of a virtual image in a composite image, the characteristics of the glasses-type information display device 2, and the like.

An aspect in which a projection image is visually recognized with the right eye of a user has been described in the embodiment, but the present disclosure is not limited to this aspect. A projection image may be visually recognized with the left eye of a user. In this case, the transmission unit 20L for a left eye is an example of the transmission unit of the present disclosure.

The captured image may be a static image or may be a video.

Further, the composition unit 64 is not limited to an aspect in which the composition unit 64 uses the detection result (position data) of the space recognition sensor 29 for registration in a case where a projection image and a captured image are to be combined with each other. For example, a projection image may be superimposed at a predetermined position on a captured image.

Further, an aspect in which the image processing device 14 comprises the image acquisition unit 60, the characteristic parameter acquisition unit 62, the composition unit 64, and the image output unit 66 has been described in each embodiment, but at least one of the smartphone 12, the smartphone 16, or the printer 18 may comprise some or all of these functional units.

Furthermore, the following various processors can be used in the embodiment as the hardware structures of processing units, such as the image acquisition unit 60, the characteristic parameter acquisition unit 62, the composition unit 64, and the image output unit 66, which perform various types of processing. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). Further, a plurality of processing units may be formed of one processor.

As an example where a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, more specifically, electrical circuitry where circuit elements, such as semiconductor elements, are combined can be used as the hardware structures of these various processors.

Further, an aspect in which the image processing program 55 is stored (installed) in the storage unit 54 in advance has been described in each embodiment, but the present disclosure is not limited thereto. The image processing program 55 may be provided in a form where the image processing program 55 is recorded in recording mediums, such as a compact disc read only memory (CD-ROM), a digital versatile disc read only memory (DVD-ROM), and a universal serial bus (USB) memory. Furthermore, the image processing program 55 may be downloaded from an external device through a network.

What is claimed is:

1. An image display system comprising:
   an information display device, wherein the information display device comprises a transmission-type display displaying to a user a real image and a projection image superimposed on the real image;
   a camera to capture an image of the real image;
   a non-transmission-type display; and
   an image processing device, wherein the image processing device comprises an image acquisition unit, a characteristic parameter acquisition unit, a composition unit, and an image output unit;
   wherein the composition unit is configured to perform composition processing for generating a composite image, which simulates a transmission state of the projection image via the transmission-type display, for display on the non-transmission-type display, on the basis of a parameter representing characteristics of a model of the transmission-type display from the projection image and the real image, as captured by the camera; and
   wherein the characteristic parameter acquisition unit, is configured to acquire characteristic parameters of the model of transmission-type display, the characteristics comprising:
   a brightness of the projection image, a brightness that is preset as the brightness of the real image being perceived by a user, a brightness of the image captured by the camera, and a brightness that is preset as the brightness of the projection image seen by the user.

2. The image display system according to claim 1,
   wherein the transmission-type display includes a transmission unit that transmits light to provide the real image to an observer and a projection unit that projects information onto the transmission unit to generate the virtual image, and
   the processor is configured to reproduce a visually-recognized image which is visually recognized by the observer who uses the transmission-type display and in which the information is inserted into a visual field of the real image and superimpose the first image, which represents the information projected onto the transmission unit, on the second image, which serves as a background of the first image, to perform the composition processing.

3. The image display system according to claim 1,
   wherein the processor is configured to perform image processing on dimensional data of a brightness of at least one of the first image or the second image and superimposes the first image on the second image.

4. The image display system according to claim 3,
   wherein, in a case in which a ratio of a brightness a2, which is preset as a brightness of the first image perceived by a human, to a brightness a1 of the first image output from the projection unit, is denoted by a, and a ratio of a brightness b2, which is preset as a brightness of the second image visually recognized by a human through a transmission unit, to a brightness b1 of the second image, is denoted by b, the processor is configured to determine a transmittance of the first image using a/b unique to a model of the transmission-type display.

5. The image display system according to claim 4,
   wherein the processor is configured to perform the composition processing using another parameter, which represents characteristics of the model separately from a/b of the transmission-type display, in addition to a/b.

6. The image display system according to claim 5, wherein the other parameter representing the characteristics of the model is at least one parameter of aberration, flare, stray light, or scattering.

7. The image display system according to claim 4, wherein the processor is configured to perform spatial thinning processing on the first image on the basis of a/b.

8. The image display system according to claim 4, wherein, in a case in which a plurality of frames of the first image are displayed at intervals, the processor is configured to determine a display time of one frame on the basis of a/b.

9. The image display system according to claim 4, wherein each of a and b has a spatial distribution in a display surface of the transmission-type display.

10. The image display system according to claim 4, wherein, in a case in which a camera for capturing the real image is provided on the transmission-type display, the second image is an image captured by the camera and b1 denotes a brightness of the second image captured by the camera.

11. The image display system according to claim 1, wherein, regardless of whether or not a camera for capturing the real image is provided on the transmission-type display, the second image is an image captured by a camera different from the camera provided on the transmission-type display or is an image created using CG.

12. The image display system according to claim 1, wherein the second image is a video.

13. The image display system according to claim 1, wherein the processor is configured to superimpose the first image on the second image on the basis of a detection result that is obtained in a case where a position of a subject, which is included in the real image, in a real space is detected by a space recognition sensor.

14. An image processing method comprising:
causing an image processing device of the image display system of claim 1 to perform composition processing for generating an image, which simulates a transmission state of a virtual image via a transmission-type display, on the basis of a parameter representing characteristics of a model of the transmission-type display from a first image serving as the basis of the virtual image and a second image indicating a real image.

15. A non-transitory computer-readable storage medium storing an image processing program executable by a processor to
perform the method of claim 14.

16. An image processing device comprising:
a processor,
wherein the processor is configured to perform composition processing for generating an image, which simulates a transmission state of a virtual image via a transmission-type display, on the basis of a parameter representing characteristics of a model of the transmission-type display from a first image serving as the basis of the virtual image and a second image indicating a real image,
wherein the processor is configured to perform image processing on dimensional data of a brightness of at least one of the first image or the second image and superimposes the first image on the second image, and
wherein, in a case in which a ratio of a brightness a2, which is preset as a brightness of the first image perceived by a human, to a brightness a1 of the first image output from the projection unit, is denoted by a, and a ratio of a brightness b2, which is preset as a brightness of the second image visually recognized by a human through a transmission unit, to a brightness b1 of the second image, is denoted by b, the processor is configured to determine a transmittance of the first image using a/b unique to a model of the transmission-type display.

* * * * *